(12) United States Patent
Takahashi

(10) Patent No.: US 12,191,515 B2
(45) Date of Patent: *Jan. 7, 2025

(54) METAL-AIR BATTERY AND METHOD OF USING THE SAME

(71) Applicant: FUJIKURA COMPOSITES Inc., Tokyo (JP)

(72) Inventor: Masaki Takahashi, Saitama (JP)

(73) Assignee: FUJIKURA COMPOSITES INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,295

(22) Filed: Apr. 7, 2023

(65) Prior Publication Data

US 2023/0246280 A1 Aug. 3, 2023

Related U.S. Application Data

(62) Division of application No. 17/270,265, filed as application No. PCT/JP2019/032924 on Aug. 22, 2019.

(30) Foreign Application Priority Data

Aug. 24, 2018 (JP) ................................. 2018-157020

(51) Int. Cl.
*H01M 50/258* (2021.01)
*H01M 12/06* (2006.01)
*H01M 50/204* (2021.01)

(52) U.S. Cl.
CPC ......... *H01M 50/258* (2021.01); *H01M 12/06* (2013.01); *H01M 50/204* (2021.01)

(58) Field of Classification Search
CPC .... H01M 12/06; H01M 12/065; H01M 12/08; H01M 50/258; H01M 50/204
See application file for complete search history.

(56) References Cited

U.S. PATENT DOCUMENTS

| 3,554,810 A | | 1/1971 | Zarome | |
| 3,682,705 A | * | 8/1972 | Petix | H01M 50/503 |
| | | | | 429/463 |

(Continued)

FOREIGN PATENT DOCUMENTS

| CN | 101814643 | * | 8/2010 | ............ H01M 12/04 |
| CN | 101814643 A | | 8/2010 | |

(Continued)

OTHER PUBLICATIONS

International Search Report and Written Opinion for International Application No. PCT/JP2019/032924 dated Oct. 29, 2019.

*Primary Examiner* — Amanda J Barrow
(74) *Attorney, Agent, or Firm* — McCormick, Paulding & Huber, PLLC

(57) ABSTRACT

Provided is a metal-air battery and a method of using the same that make it possible to simplify replacement work while also sustaining high output effectively. The metal-air battery includes a cell unit provided with a plurality of metal-air battery cells in parallel, each metal-air battery cell being configured to include a metal electrode, an air electrode disposed facing the metal electrode, and a housing that supports the metal electrode and the air electrode. The metal-air battery also includes handles for example that act as a first replacing means enabling the replacement of the entire cell unit. With this arrangement, it is possible to simplify replacement work while also sustaining high output effectively.

3 Claims, 7 Drawing Sheets

(56) References Cited

U.S. PATENT DOCUMENTS

| | | | |
|---|---|---|---|
| 3,682,706 A | | 8/1972 | Yardney et al. |
| 4,871,627 A | * | 10/1989 | Strong ................ H01M 12/065 |
| | | | 429/176 |
| 4,950,561 A | * | 8/1990 | Niksa .................. H01M 50/193 |
| | | | 429/406 |
| 5,462,816 A | | 10/1995 | Okamura et al. |
| 9,742,048 B2 | | 8/2017 | Yoshida et al. |
| 11,462,806 B2 | | 10/2022 | Takahashi et al. |
| 2005/0123815 A1 | | 6/2005 | Tsai et al. |
| 2016/0197388 A1 | | 7/2016 | Kogan et al. |
| 2018/0076425 A1 | | 3/2018 | Takahashi et al. |
| 2021/0305666 A1 | * | 9/2021 | Takahashi ........... H01M 50/682 |

FOREIGN PATENT DOCUMENTS

| | | | | |
|---|---|---|---|---|
| CN | 107240661 | * | 10/2017 | .......... H01M 50/204 |
| CN | 107482281 A | | 12/2017 | |
| JP | S52-222526 | * | 2/1977 | |
| JP | H07-130406 A | | 5/1995 | |
| JP | 2004-362869 A | | 12/2004 | |
| TW | 201733196 A | | 9/2017 | |
| WO | 2015/076299 A1 | | 5/2015 | |

* cited by examiner

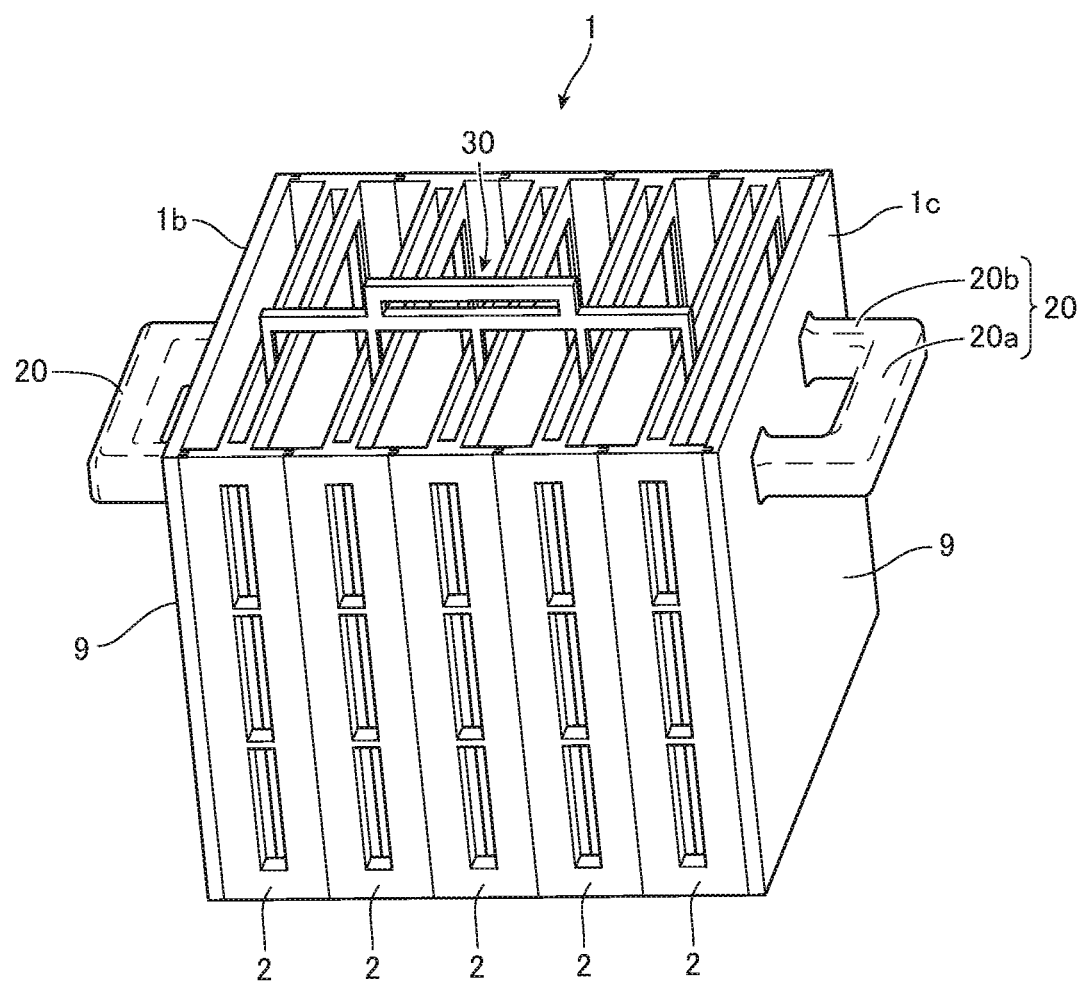

METAL-AIR BATTERY AND METHOD OF USING THE SAME

CROSS-REFERENCE TO RELATED APPLICATIONS

This application is a divisional of U.S. patent application Ser. No. 17/270,265, filed on Feb. 22, 2022, which is a National Stage application of International Patent Application No. PCT/JP2019/032924, filed on Aug. 22, 2019, which claims priority to Japanese Patent Application No. JP2018-157020, filed on Aug. 24, 2018, each of which is hereby incorporated by reference in its entirety.

TECHNICAL FIELD

The present invention relates to a metal-air battery including a cell unit provided with a plurality of metal-air battery cells, and a method of using the same.

BACKGROUND OF THE INVENTION

In a metal-air battery, in an air electrode that acts as the cathode, ambient oxygen is utilized as the cathode active material, and an oxidation-reduction reaction of the oxygen is performed. On the other hand, in a metal electrode that acts as the anode, an oxidation-reduction reaction of the metal is performed. A metal-air battery has high energy density and is anticipated to function as a device such as an emergency power source during a disaster, or the like. Power generation is started by supplying an electrolytic solution to the metal-air battery.

Such a metal-air battery of the related art is a single-use primary battery, but Japanese Patent Laid-Open No. 2004-362869 proposes a metal-air battery structure in which the metal electrode can be taken out and replaced.

SUMMARY

Meanwhile, if a cell unit provided with a plurality of metal-air battery cells in parallel is configured, high output can be obtained.

However, Japanese Patent Laid-Open No. 2004-362869 does not describe the replacement work with respect to a cell unit for sustaining high output.

Accordingly, the present invention has been devised in light of such points, and an object thereof is to provide a metal-air battery and a method of using the same that make it possible to simplify replacement work while also sustaining high output effectively.

A metal-air battery of the present invention comprises a cell unit provided with a plurality of metal-air battery cells in parallel, each metal-air battery cell being configured to include a metal electrode, an air electrode disposed facing the metal electrode, and a housing that supports the metal electrode and the air electrode.

The metal-air battery also comprises a first replacing means enabling the replacement of the entire cell unit.

Also, a metal-air battery of the present invention comprises a cell unit provided with a plurality of metal-air battery cells in parallel, each metal-air battery cell being configured to include a metal electrode, an air electrode disposed facing the metal electrode, and a housing that supports the metal electrode and the air electrode. The plurality of metal electrodes are supported by the housing in a replaceable way. The metal-air battery also comprises a second replacing means enabling a replacement of the plurality of metal electrodes at the same time.

The above metal-air battery may additionally comprise a first replacing means enabling a replacement of the entire cell unit.

Also, in the present invention, preferably, the replacing means is provided at a position higher than a surface height of an electrolytic solution on the cell unit.

Also, in the present invention, preferably, the replacing means is provided with a finger-catching part on which a finger catches.

Also, the present invention is a method of using the metal-air battery described above, the method comprising continuing power generation while replacing the entire cell unit or the plurality of metal electrodes at the same time.

According to the metal-air battery of the present invention, it is possible to simplify replacement work while also sustaining high output effectively.

BRIEF DESCRIPTION OF THE DRAWINGS

FIG. 1 is a perspective view of a cell unit configuring a metal-air battery according to the present embodiment.

DESCRIPTION OF THE PREFERRED EMBODIMENTS

Figure 2A:
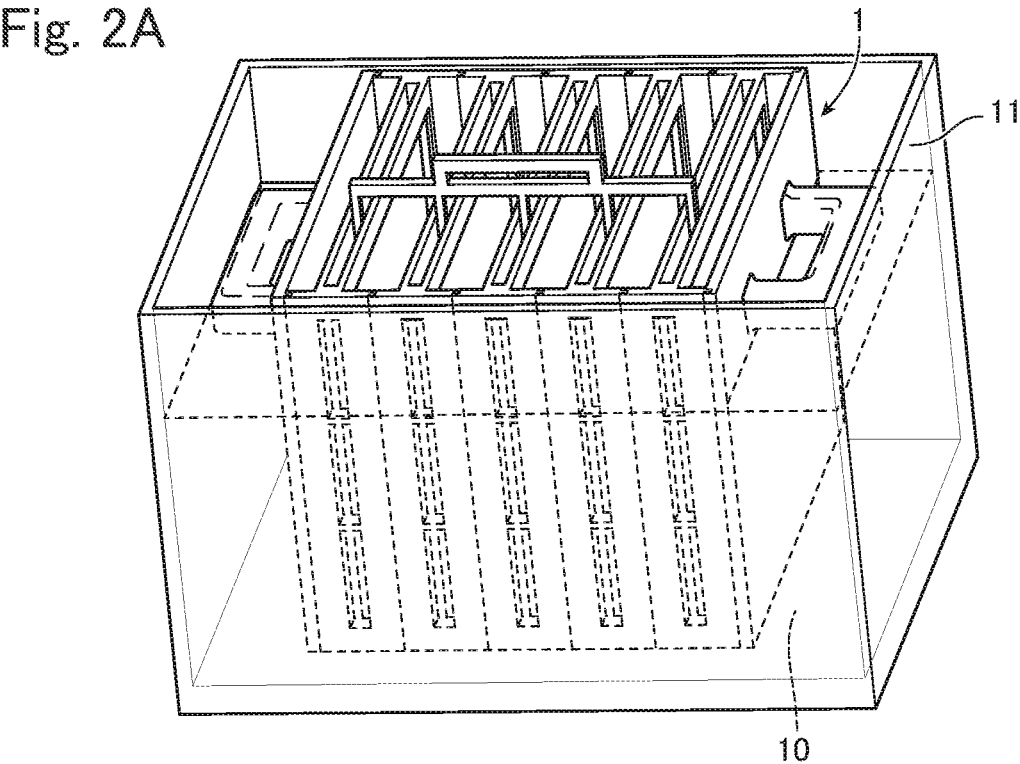
FIG. 2A is a perspective view of a metal-air battery illustrating a state in which the cell unit according to the present embodiment is immersed in an electrolytic solution.

Hereinafter, an embodiment for carrying out the present invention (hereinafter abbreviated to the "embodiment") will be described in detail. However, the present invention is not limited to the following embodiments, and may also be modified in various ways while remaining within the scope of the present invention.

The inventor's attempt to achieve continuous power generation even with a primary battery in a metal-air battery including a cell unit (metal-air battery unit) provided with a plurality of metal-air battery cells in parallel led to the development of a configuration with improved replacement work efficiency, in which the entire cell unit or a plurality of metal electrodes can be replaced at the same time.

Hereinafter, a metal-air battery according to the present embodiment will be described in detail with reference to the drawings, and in the following, a "metal-air battery" may also refer to the cell unit itself provided with a plurality of metal-air battery cells in parallel, and may also refers to a combination of the cell unit and a power generation tank containing an electrolytic solution.

FIG. 1 is a perspective view of a cell unit configuring a metal-air battery according to the present embodiment. As illustrated in FIG. 1, a cell unit 1 contains five metal-air battery cells 2 provided in parallel, for example. However, the number of metal-air battery cells 2 is not limited.

The cell unit 1 according to the present embodiment is a combination of a plurality of metal-air battery cells 2 having the same structure. In the present embodiment, the plurality of metal-air battery cells 2 are combined into a unified piece. The metal-air battery cells 2 may be combined into a unified piece by each being bonded to each other with an adhesive or the like, or may be unified by being fitted together using mutually engaging parts or the like.

As illustrated in FIG. 1, side faces 1b and 1c on either side of the cell unit 1 are provided with handles 20 that act as an example of a "first replacing means". The handles 20 are configured to include a grip part (finger-catching part) 20a that can be gripped with the fingers, and arm parts 20b that join the grip part 20a to the side faces 1b and 1c on either side of the cell unit 1.

As illustrated in FIG. 2A, the cell unit 1 illustrated in FIG. 1 is immersed in a power generation tank 11 containing an electrolytic solution 10. At this time, the electrolytic solution 10 is injected into a liquid chamber (described later) provided between air electrodes and a metal electrode provided in each metal-air battery cell 2.

For example, when the metal electrode is magnesium, the oxidation reaction expressed by (1) below occurs near the metal electrode. Additionally, the reduction reaction expressed by (2) below occurs in the air electrodes. For a magnesium-air battery as a whole, the reaction expressed by (3) below occurs, and electricity is discharged.

$$2Mg \rightarrow 2Mg^{2+} + 4e^- \quad (1)$$

$$O_2 + 2H_2O + 4e^- \rightarrow 4OH^- \quad (2)$$

$$2Mg + O_2 + 2H_2O \rightarrow 2Mg(OH)_2 \quad (3)$$

Figure 2B:
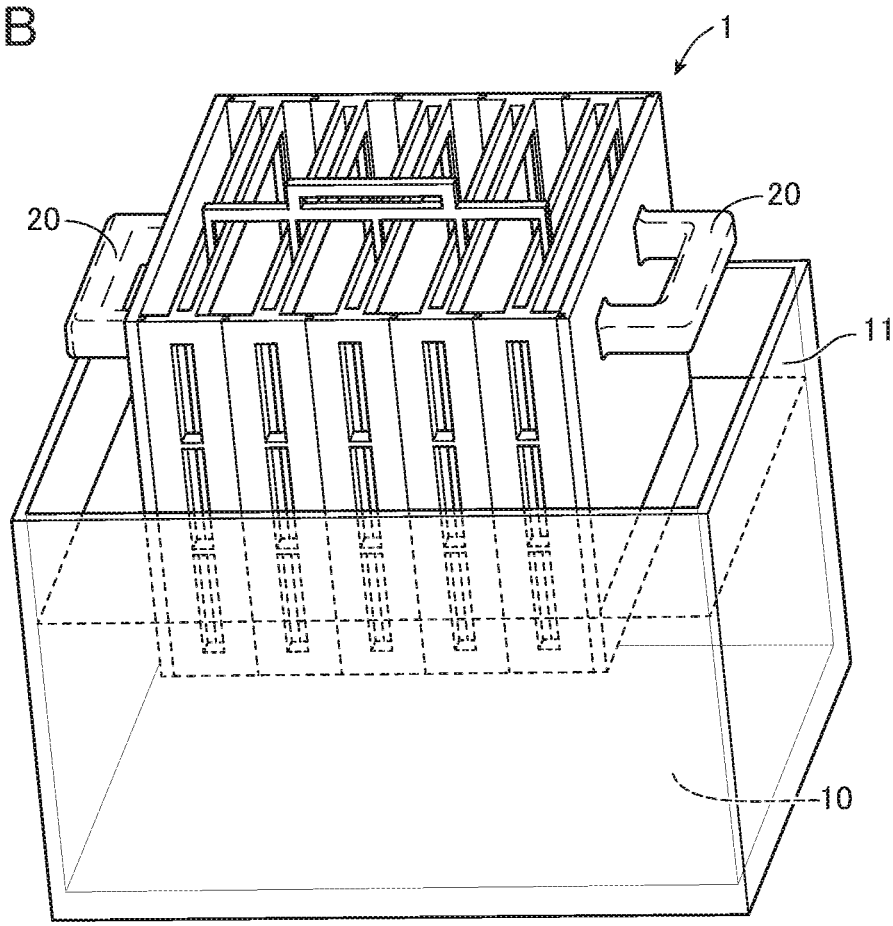
FIG. 2B is a perspective view for explaining the work of replacing the cell unit.

Note that a product $(Mg(OH)_2)$ is produced during the oxidation-reduction reaction between the metal electrode and the air electrodes. The magnesium gradually decreases due to electric discharge, and the output is reduced. Accordingly, in the present embodiment, to enable continuous power generation even with a primary battery, the handles 20 are used to lift up an old cell unit 1 with decreased magnesium from the electrolytic solution 10, as illustrated in FIG. 2B. Thereafter, a new cell unit 1 is immersed in the electrolytic solution 10 instead. With this arrangement, continuous power generation is possible. The electrolytic solution 10 in the power generation tank 11 can still be used after replacing the cell unit 1. Note that with the configuration of the metal-air battery cells 2 described later, the product produced during the oxidation-reduction reaction between the metal electrode and the air electrodes is discharged into the electrolytic solution 10 in the power generation tank 11, and therefore recirculation of the electrolytic solution 10 may also be promoted by providing the power generation tank 11 with a mechanism that recirculates the electrolytic solution 10, for example.

In this way, by using the cell unit 1 with the configuration illustrated in FIG. 1, the entire cell unit can be replaced, thereby simplifying the replacement work, and sustaining high output over a long time.

Figure 3A:
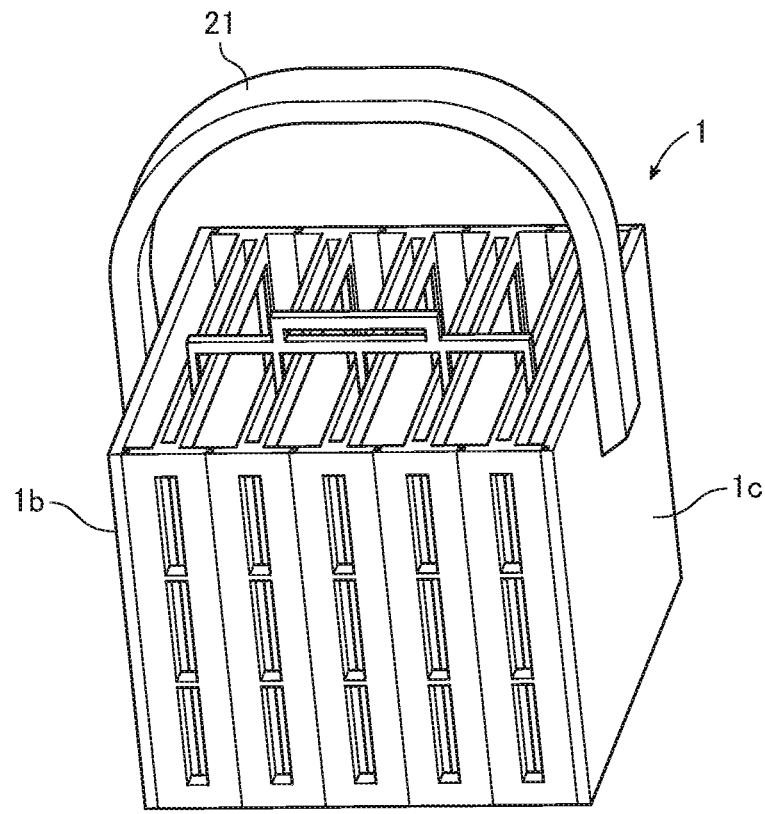
FIG. 3A is a perspective view of a cell unit that is partially different from FIG. 1.
Figure 3B:
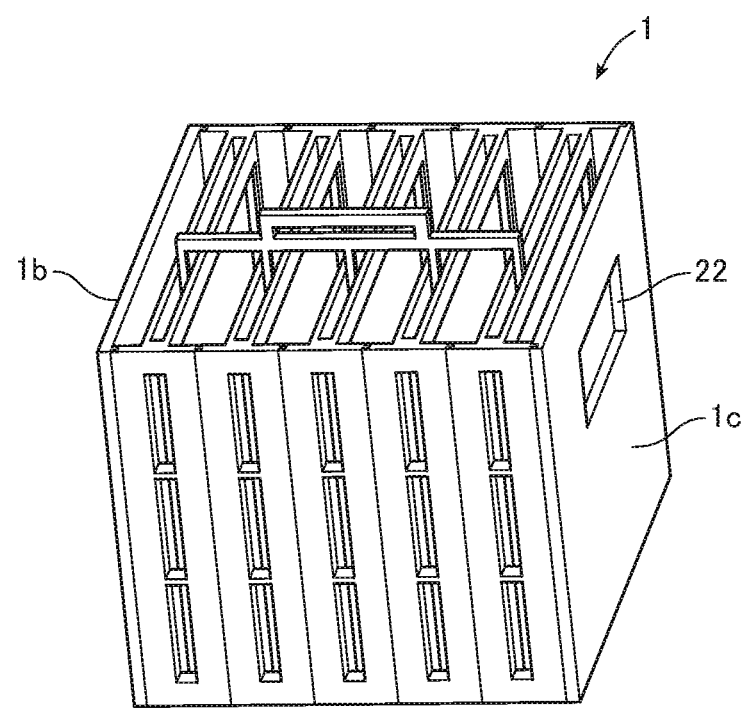
FIG. 3B is a perspective view of a cell unit that is partially different from FIG. 1.

In FIG. 1, the handles 20 are respectively provided on the side faces 1b and 1c on either side of the cell unit 1, but as illustrated in FIG. 3A, a handle 21 may be provided to cross over the top of the cell unit 1 and join the side faces 1b and 1c, or as illustrated in FIG. 3B, a depressed part (finger-catching part) 22 that is depressed inwardly may be respectively provided on each of the side faces 1b and 1c of the cell unit 1. The cell unit 1 can be replaced easily by, for example, catching the fingers on the depressed parts 22.

Figure 4:
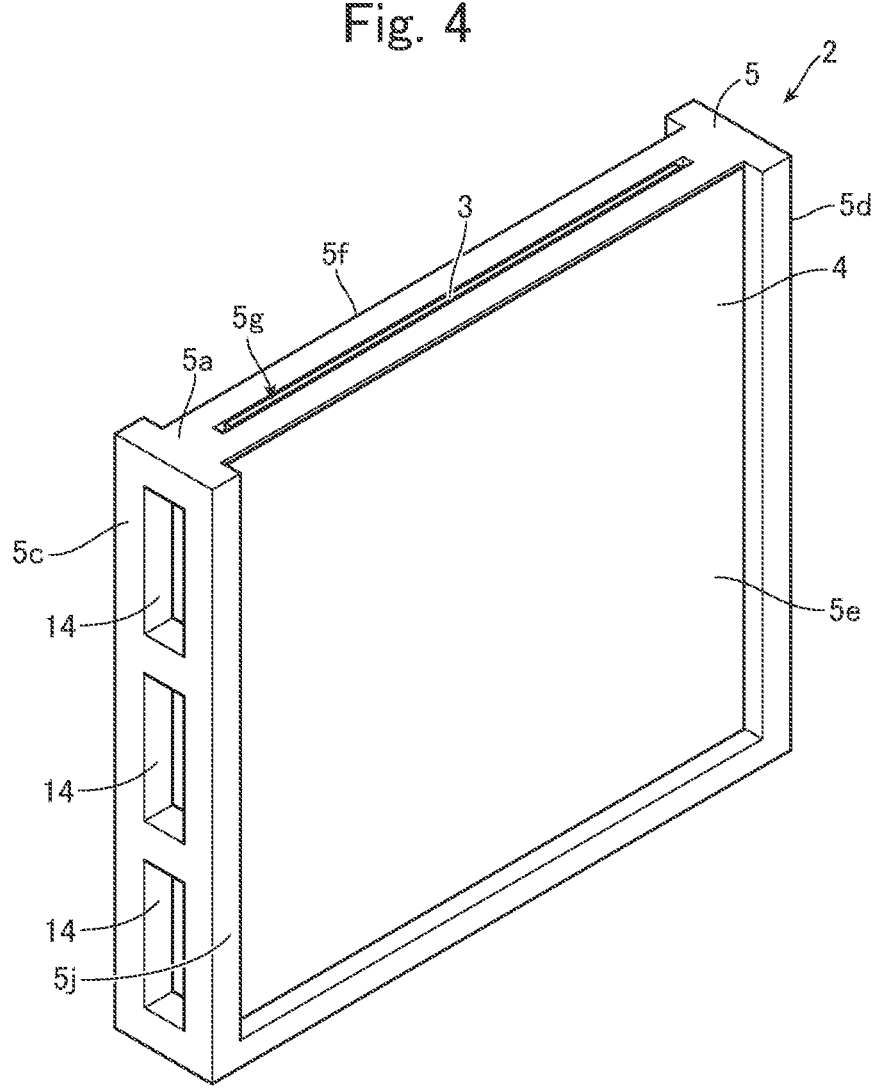
FIG. 4 is a perspective view of a metal-air battery cell according to the present embodiment.

Next, the structure of the metal-air battery cell 2 will be described in detail using FIGS. 4 and 5. As illustrated in FIG. 4, the metal-air battery cell 2 is configured to include a metal electrode 3, air electrodes 4, and a housing 5 that supports the metal electrode 3 and the air electrodes 4.

Figure 5A:
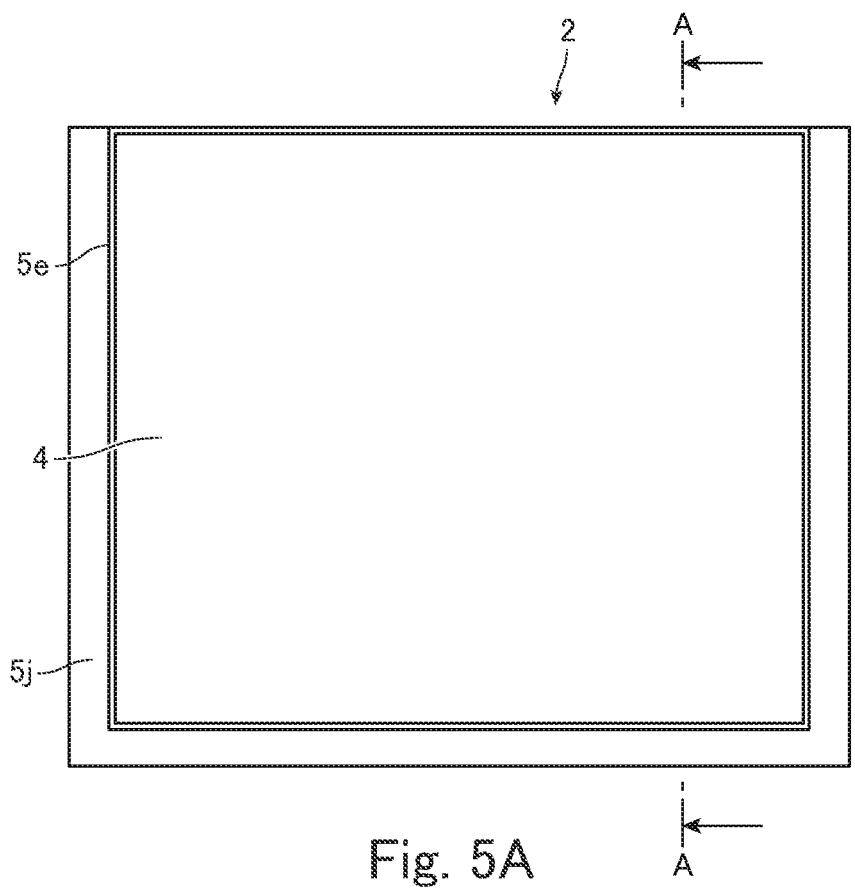
FIG. 5A is a front view of the metal-air battery cell illustrated in FIG. 4.
Figure 5B:
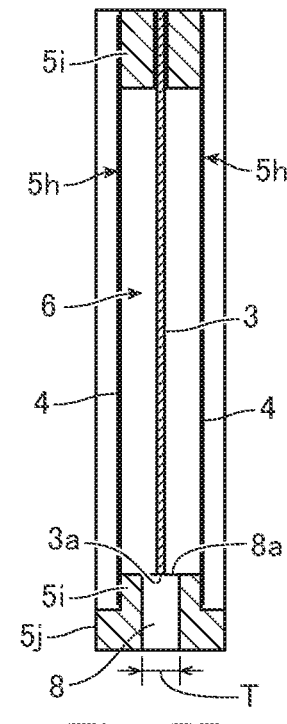
FIG. 5B is a cross-sectional view cutting the metal-air battery cell illustrated in FIG. 5A along the line A-A and viewed from the direction of the arrow.
Figure 5C:
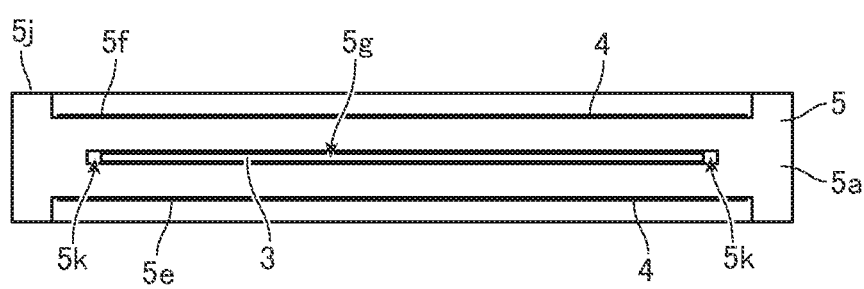
FIG. 5C is a plan view of the metal-air battery cell.

As illustrated in FIGS. 5B and 5C, the air electrodes 4 are disposed on either side of the metal electrode 3 with intervals in between, and are also exposed on an outer face on either side of the housing 5.

As illustrated in FIG. 4 and FIGS. 5A to 5D, the housing 5 has an upper part 5a, a lower part 5b, and a front part 5c, a back part 5d, and side parts 5e and 5f that join the upper part 5a and the lower part 5b. The housing 5 may be molded in a single piece, or the housing 5 may be configured by combining each of the plurally divided molded bodies.

The upper part 5a of the housing 5 is provided with a slit 5g, and the metal electrode 3 is fixed and supported inside the slit 5g. As illustrated in FIG. 5C, the width of the slit 5g formed in the upper part 5a of the housing 5 of the metal-air battery cell 2 is greater than the width of the metal electrode 3. Communication holes 5k leading to a liquid chamber 6 are formed between the metal electrode 3 and the slit 5g.

The side parts 5e and 5f of the housing 5 are each provided with a window 5h (see FIG. 5B). Also, a securing part 5i that surrounds the entire perimeter on the upper side, lower side, left side, and right side of each window 5h is formed. In FIG. 5B, the securing part 5i positioned on the upper side and lower side of the windows 5h is illustrated, but in actuality, the securing part 5i also exists on the left side and right side of the windows 5h, and the entire perimeter of each window 5h is surrounded by the securing part 5i.

As illustrated in FIG. 5B, each air electrode 4 is affixed to the securing part 5i of each of the side parts 5e and 5f with an adhesive or the like, and closes up each window 5h. By closing up the windows 5h respectively provided in the side parts 5e and 5f of the housing 5, a liquid chamber 6 is formed between the air electrodes 4 affixed to the side parts 5e and 5f. The liquid chamber 6 is enclosed except for through-holes 8 and 14 that act as supply ports for the electrolytic solution 10.

As illustrated in FIGS. 4, 5A, 5B, and 5C, a frame part 5j is formed around the outer perimeter of the securing part 5i except the upper side. In other words, the frame part 5j is formed to enclose the lower side, left side, and right side of the securing part 5i. Additionally, the frame part 5j also projects farther outward than the securing part 5i. For this reason, a step is formed between the frame part 5j and the securing part 5i. As illustrated in FIGS. 4, 5B, and 5C, the air electrodes 4 are disposed at positions recessed (farther back) from the surface of the frame part 5j. Consequently, a space that is open above and in front of the air electrode 4 is formed between the air electrode 4 and the frame part 5j.

Figure 6:
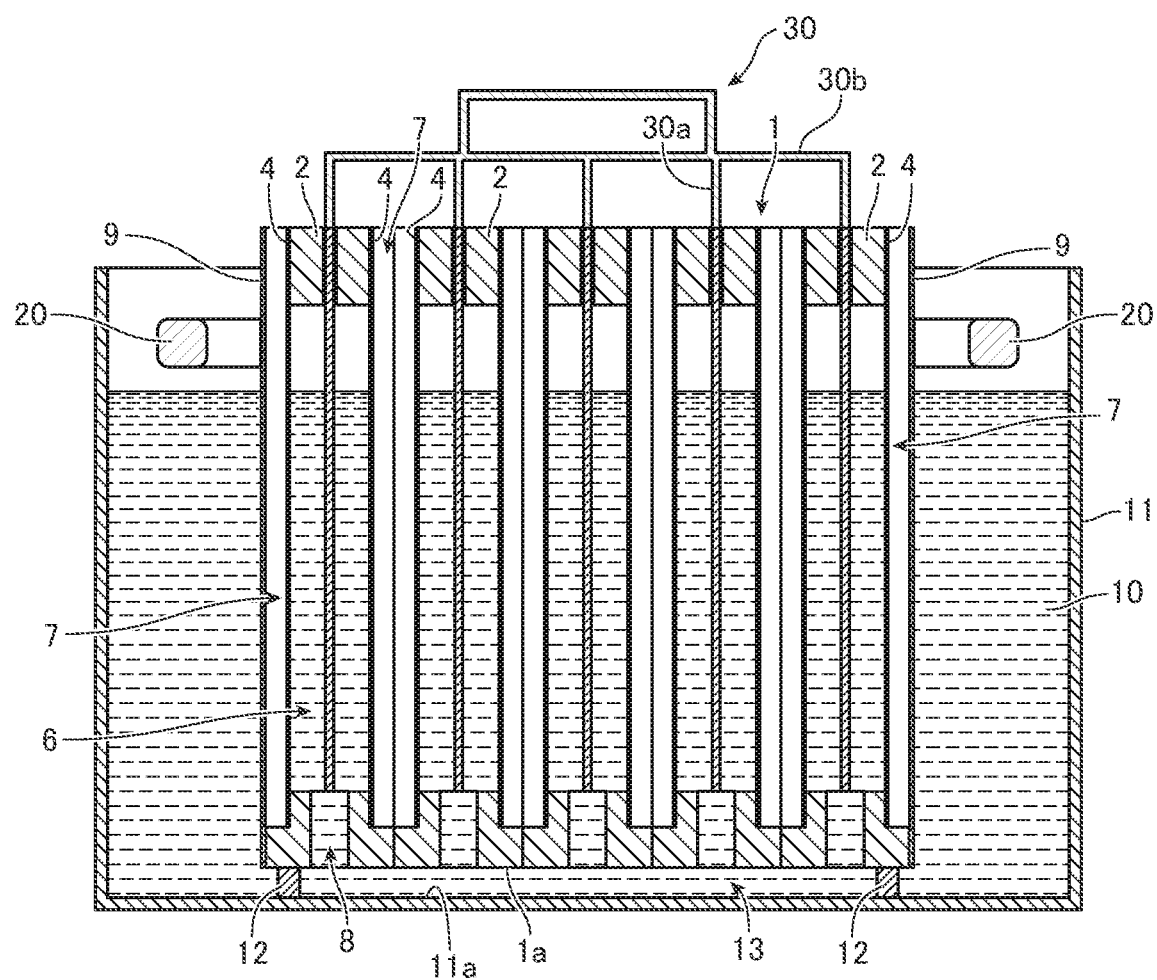
FIG. 6 is a cross-sectional view of the metal-air battery illustrating a state in which the cell unit according to the present embodiment is immersed in an electrolytic solution.

By providing a plurality of metal-air battery cells 2 in parallel, this space configures an air chamber 7 that is open only on top (see FIG. 6).

Figure 5D:
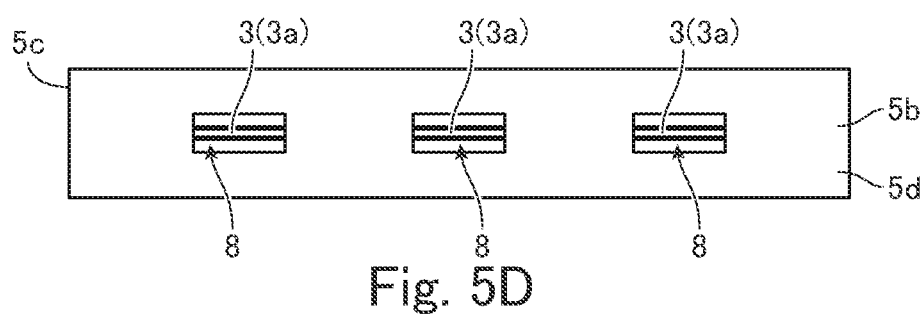
FIG. 5D is a back view of the metal-air battery cell.

As illustrated in FIGS. 5B and 5D, through-holes 8 leading to the liquid chamber 6 are formed in the lower part 5b of the housing 5. A width dimension T of the through-hole 8 is greater than the thickness of the metal electrode 3. Here, the "width dimension" refers to the dimension in the direction proceeding from the side part 5e on one side of the housing 5 to the side part 5f on the other side. As illustrated in FIGS. 5B and 5D, the through-holes 8 are formed at positions facing a lower end 3a of the metal electrode 3. Consequently, as illustrated in FIG. 5D, the lower end 3a of the metal electrode 3 can be seen through the through-holes 8. As illustrated in FIGS. 5B and 5D, the metal electrode 3 is preferably disposed to be positioned in the center of the width dimension T of the through-holes 8.

In the present embodiment, the positional relationship between the lower end 3a of the metal electrode 3 and an upper end 8a of the through-hole 8 is not limited, but as illustrated in FIG. 5B, the lower end 3a of the metal electrode 3 is preferably disposed at a position at or above the upper end 8a of the through-hole 8. Here, a "position at or above the upper end 8a" includes the position of the upper end 8a and positions higher than the upper end 8a. With this arrangement, product produced by the reaction between the metal electrode 3 and the air electrodes 4 can be discharged effectively to the outside from the through-holes 8. Also, in the present embodiment, because the air electrodes 4 are provided on both the left and right sides of the metal electrode 3, the product is generated on both the left and right sides of the metal electrode 3. For this reason, by disposing the metal electrode 3 in the center of the width dimension T of the through-hole 8 as described above, the product generated from both the left and right sides of the metal electrode 3 can be discharged to the outside through the through-holes 8 appropriately.

Also, as illustrated in FIG. 5B, the lower end 3a of the metal electrode 3 is a free end. With this arrangement, the lower end 3a of the metal electrode 3 can be made to swing. For this reason, when product has accumulated between the air electrodes 4 and the metal electrode 3, the metal electrode 3 can be made to yield, the pressing strength due to the product can be alleviated, and damage to the metal electrode 3 and the air electrodes 4 can be suppressed.

In FIG. 5D, the shape of each through-hole 8 is rectangular, but the shape is not limited to rectangular and may also be another shape. Also, in FIG. 5D, there are three through-holes 8, but the number of through-holes 8 is not limited.

The through-holes 8 function as a supply port that supplies an electrolytic solution to the liquid chamber 6, and also have a function of discharging the product produced by the reaction between the metal electrode 3 and the air electrodes 4 to the outside of the cell unit 1.

In this way, insofar as it is possible to supply the electrolytic solution and discharge the product, the position where the through-holes 8 are formed is not limited to the lower part 5b of the housing 5. In FIG. 4, through-holes 14 are also provided in the front part 5c of the housing 5. In FIG. 4, a plurality of through-holes 14 are formed at intervals in the height direction of the front part 5c. These through-holes 14 lead to the liquid chamber 6, similarly to the through-holes 8. Also, although not illustrated, the through-holes 14 may also be provided in the back part 5d of the housing 5. At least some of the through-holes 14 provided in front part 5c and the back part 5d of the housing 5 are preferably disposed on the lower side of the front part 5c or the back part 5d. The "lower side" refers to the lower half of the height dimension of the front part 5c and back part 5d, preferably a lower portion less than or equal to ½ the height dimension, more preferably a lower portion less than or equal to ⅓ the height dimension. In this way, even if the through-holes 14 are provided in the front part 5c or the back part 5d of the housing 5, it is possible to supply an electrolytic solution 10 and discharge the product.

However, because the product falls through the liquid chamber 6 due to its own weight, forming the through-holes 8 in the lower part 5b of the housing 5 is preferable because the discharge of the product can be promoted effectively. In the present embodiment, the through-holes 8 are provided in the lower part 5b and the through-holes 14 are provided in the front part 5c and the back part 5d of the housing 5.

Also, in FIG. 5D, the through-holes 8 provided in the lower part 5b of the housing 5 are plurally formed at equal intervals in the width direction of the metal electrode 3 (the direction proceeding from the front part 5c toward the back part 5d of the housing 5), but a long slit-shaped through-hole 8 that communicates from the through-hole 8 on the left side to the through-hole 8 on the right side illustrated in FIG. 5D may also be formed. However, if the through-hole 8 has a long slit shape, even if the product produced by the reaction between the metal electrode 3 and the air electrodes 4 once exits to the outside through the through-hole 8, the product may easily go back inside the liquid chamber 6 through the through-hole 8 again due to a liquid flow or the like. Consequently, forming a plurality of separate through-holes 8 as illustrated in FIG. 5D is more preferable for discharging the product effectively. Note that in configurations that do not induce a liquid flow, the through-hole 8 may have a long slit shape that communicates with each through-hole 8.

In the present embodiment, a plurality of the metal-air battery cells 2 described in detail above are provided in parallel as a unified piece. In the parallel state, because the outer sides of the metal-air battery cells 2 positioned on either end are in an exposed state, plates 9 that configure the side faces 1b and 1c on either side of the cell unit 1 are adhered to close up the side faces on either side. Note that the handles 20 illustrated in FIG. 1 for example are attached to the plates 9. With this arrangement, as illustrated in FIG. 1, the cell unit 1 including the plurality of metal-air battery cells 2 and the handles 20 for example that act as the first replacing means is completed.

As illustrated in FIG. 6, if the cell unit 1 illustrated in FIG. 1 is immersed in the power generation tank 11 containing the electrolytic solution 10, the electrolytic solution 10 is injected into each liquid chamber 6 through the through-holes 8 and the through-holes 14. Note that the through-holes 14 are not illustrated in FIG. 6. Also, as described using FIG. 5C, because the communication holes 5k leading to the liquid chamber 6 are formed between the metal electrode 3 and the slit 5g in the upper part 5a of the housing 5, when injecting the electrolytic solution 10 into the liquid chamber 6, air in the liquid chamber 6 escapes to the outside from the communication holes 5k, and the electrolytic solution 10 can be smoothly guided into the liquid chamber 6 through the through-holes 8 and 14.

Also, in FIG. 6, projecting parts 12 are provided between a bottom face 11a of the power generation tank 11 and a lower face 1a of the cell unit 1. For this reason, a gap 13 of predetermined height is formed between the bottom face 11a of the power generation tank 11 and the lower face 1a of the cell unit 1. Consequently, the lower face 1a of the cell unit 1 does not touch the bottom face 11a of the power generation tank 11.

At this time, as illustrated in FIG. 6, the handles 20 for example that act as the first replacing means are provided at a position higher than the surface height of the electrolytic solution 10. With this arrangement, the handles 20 can be grasped to easily lift up the cell unit 1 from the electrolytic solution 10. Also, a joining part 30 for example that acts as a second replacing means making it possible to replace a plurality of metal electrodes 3 at the same time described later is also provided at a position higher than the surface height of the electrolytic solution 10.

As illustrated in FIG. 6, by injecting the electrolytic solution 10 into the liquid chamber 6, when the metal electrode 3 is magnesium for example, the oxidation-reduction reaction described above occurs between the metal electrode 3 and the air electrodes 4, and electricity is discharged.

At this time, hydrogen produced by a side reaction of the battery reaction can be discharged to the outside from the communication holes 5k leading to the liquid chamber 6 (see FIG. 5C). Hydrogen can also be discharged to the outside from the through-holes 14 positioned at or above the surface of the electrolytic solution.

Also, the product ($Mg(OH)_2$) produced during the oxidation-reduction reaction between the metal electrode 3 and the air electrodes 4 can be discharged toward the bottom face 11a side of the power generation tank 11 through the through-holes 8 provided in the lower part and the through-holes 14 provided in the side parts of each metal-air battery cell 2. Also, in the present embodiment, because the gap 13 is formed between the bottom face 11a of the power generation tank 11 and the lower face 1a of the cell unit 1, the product can be released from the liquid chamber 6 of cell unit 1 toward the bottom face 11a of the power generation tank 11 appropriately. According to the above, it is possible to keep the product from accumulating inside the liquid chamber 6 of each metal-air battery cell 2 and also suppress electrode damage and degradation of electrical performance, and increased lifetime can be attained.

In the present embodiment, the entire cell unit 1 can be newly replaced on the basis of factors such as reduced output associated with a decrease in the metal electrode 3 due to the oxidation-reduction reaction between the metal electrode 3 and the air electrodes 4 described above. At this time, because the cell unit 1 is provided with the handles 20 for example that act as the first replacing means, it is possible to replace the entire cell unit 1 easily.

Alternatively, the present embodiment may take a configuration making it possible to replace a plurality of metal electrodes 3 at the same time. For example, as illustrated in FIGS. 1 and 6, the joining part 30 that acts as the "second replacing means" and connects the top ends of each of the metal electrodes 3 to each other is provided. The joining part 30 is a framework structure obtained by combining vertical bars 30a and horizontal bars 30b. With this arrangement, the fingers can catch onto a portion of the joining part 30.

Figure 7A:
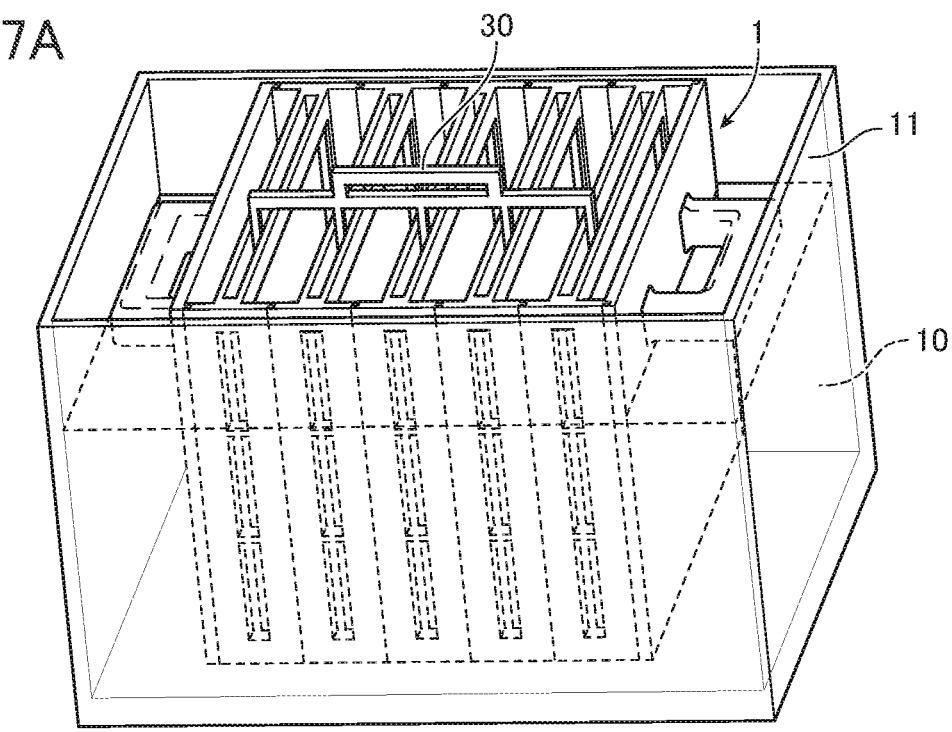
FIG. 7A is a perspective view of a metal-air battery illustrating a state in which the cell unit according to the present embodiment is immersed in an electrolytic solution.
Figure 7B:
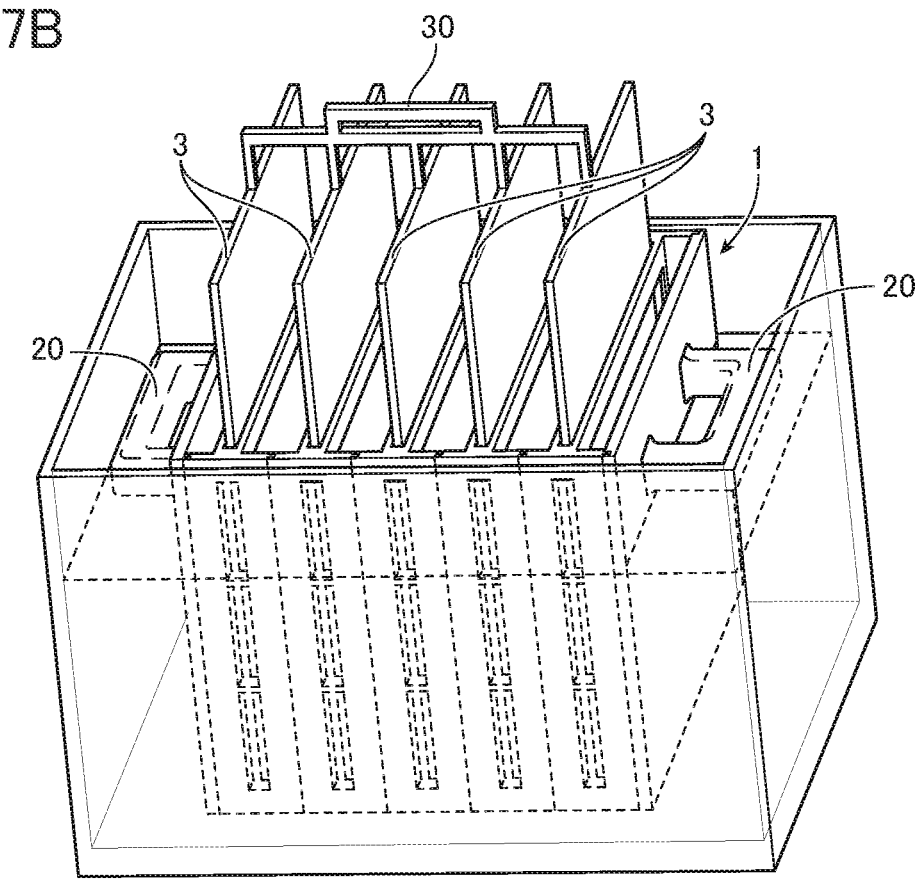
FIG. 7B is a perspective view for explaining the work of replacing metal plates.

As illustrated in FIG. 7A, during a replacement period for the metal electrodes 3 after immersing the cell unit 1 in the power generation tank 11 containing the electrolytic solution 10, as illustrated in FIG. 7B, the joining part 30 can be used to pull out the plurality of metal electrodes 3 from the housing 5 of the cell unit 1 at the same time and replace the plurality of metal electrodes 3 at the same time. At this time, for example, it may be configured such that the plurality of metal electrodes 3 can be slidably inserted into the metal-air battery cell 2 from the outside, and when inserted to a predetermined position, the metal electrodes 3 cannot be inserted any farther. In this way, with the configuration enabling a plurality of metal electrodes 3 to be replaced, the portions of the cell unit 1 other than the metal electrodes can still be used after replacing the metal electrodes 3, thereby saving costs.

The cell unit 1 illustrated in FIG. 1 is provided with the handles 20 for example as the first replacing means enabling the entire cell unit to be replaced and the joining part 30 for example as the second replacing means enabling a plurality of metal electrodes 3 to be replaced at the same time, but it is sufficient to provide at least one of the above. However, providing both types of replacing means makes it possible to choose whether to replace the entire cell unit or replace only the metal electrodes 3 according to the circumstances. For example, by performing a first replacement work of replacing only the metal electrodes 3, and then in the case where a considerable amount of the product has accumulated inside the cell unit 1, by performing a second replacement work of replacing not only the metal electrodes 3 but the entire cell unit, high output can be sustained effectively.

Note that the cell unit 1 preferably takes a configuration in which the through-holes 8 and 14 are provided in each metal-air battery cell 2 to enable the discharge of the product, while in addition, the joining part 30 for example that acts as the second replacing means is provided as a mandatory component to make it possible to replace the plurality of metal electrodes 3 at the same time. With this arrangement, it is possible to discharge the product from the cell unit 1 while also replacing the metal electrodes 3 easily, and high output can be sustained effectively with a simple method. Also, the portions of the cell unit 1 other than the metal electrodes 3 can be applied without being replaced, thereby saving costs.

Note that in the present embodiment, when it is desirable to end power generation, by lifting the cell unit 1 or lowering the power generation tank 11 from the state in FIG. 2A or FIG. 7A and draining the electrolytic solution 10 out of the liquid chamber 6 in each metal-air battery cell 2 through the through-holes 8, power generation can be stopped easily. Alternatively, power generation may also be stopped by draining the electrolytic solution 10 from the power generation tank 11 in the state with the cell unit 1 disposed inside. Furthermore, the battery reaction can also be stopped by removing the metal electrodes 3 that act as the anode.

Also, in the present embodiment, the configuration of the first replacing means that enables the entire cell unit to be replaced and the configuration of the second replacing means that enables a plurality of metal electrodes to be replaced at the same time may also be different from the configurations illustrated in FIGS. 1 and 3. For example, providing the first replacing means and the second replacing means with finger-catching parts on which the fingers can catch is preferable as it enables easy replacement, but a configuration without finger-catching parts is also possible. For example, a hole or the like that enables an object such as a tool to be connected to the cell unit 1 and the plurality of metal electrodes 3 at the same time may also be formed. Hooking the tool into the hole and hanging the cell unit 1 or the plurality of metal electrodes 3 makes replacement possible.

Alternatively, a configuration is possible in which, if a switch provided on the power generation tank 11 is pressed in the state with the cell unit 1 immersed in the electrolytic solution 10 inside the power generation tank 11 as illustrated in FIG. 6, for example, the cell unit 1 rises up from the electrolytic solution 10, and the cell unit 1 is replaced by using the hands to grasp the side faces of the cell unit 1 exposed to the outside of the electrolytic solution 10. Such a mechanism of raising the cell unit 1 upward can be provided in the gap 13 formed between the bottom face 11a of the power generation tank 11 and the lower face 1a of the cell unit 1 illustrated in FIG. 6, for example.

Note that the configuration of the metal-air battery cell 2 illustrated in FIG. 5 is one example, and the metal-air battery cell 2 is not limited to this configuration. For example, in FIG. 5, the air electrodes 4 are disposed on both sides of the metal electrode 3, but there may also be one each of the metal electrode 3 and the air electrode 4. Alternatively, a plurality of each of the metal electrodes 3 and the air electrodes 4 may be provided.

In addition, a roof part not illustrated may also be provided on the upper face of the cell unit 1 illustrated in FIG. 1. The roof part may also be provided with openings that lead to each air chamber 7 to allow air to flow into each air chamber 7 through the openings in the roof part.

Also, an external connection terminal that supplies battery output to the outside may also be installed on the roof part described above. The external connection terminal may be a connector or a USB port, or the like, but is not particularly limited. A plurality of external connection terminals can be provided. For example, a mobile device can be connected directly to an external connection terminal provided on the cell unit 1 and be supplied with power. As another example, a connection substrate such as a USB hub can also be connected to an external connection terminal of the cell unit 1 to form a configuration that supplies power to multiple mobile devices through the connection substrate.

In the present embodiment, each of the electrodes of each of the metal-air battery cells 2 may be connected in series or connected in parallel, and the wiring method is not particularly limited.

Additionally, in the method of using the metal-air battery according to the present embodiment, the continuation of power generation is possible while replacing the entire cell unit or a plurality of metal electrodes at the same time. Note that the "continuation of power generation" here means that power generation can be extended compared to an ordinary primary battery, and is defined such that even if power generation is stopped during replacement, the "continuation of power generation" is achieved before and after the replacement.

Also, a magnesium-air battery or another type of metal-air battery is applicable as the metal-air battery according to the present embodiment.

The metal-air battery of the present invention can be used as an emergency power source for which replacement work can be simplified while also sustaining high output effectively.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A metal-air battery comprising:
a cell unit provided with a plurality of metal-air battery cells in parallel, each metal-air battery cell being configured to include:
a metal electrode,
an air electrode disposed facing the metal electrode, and
a housing that supports the metal electrode and the air electrode; and
a power generation tank containing an electrolytic solution,
wherein a handle is further provided on a side of the cell unit, the handle enabling a replacement of the cell unit, and
wherein a through-hole is formed in each metal-air battery cell to supply the respective cells with electrolytic solution when the cell unit is immersed in the power generation tank, and to discharge externally from the cells into the power generation tank a product produced by a reaction of the metal electrodes and the air electrodes.

2. The metal-air battery according to claim 1, wherein the handle is provided at a position higher than a surface height of the electrolytic solution when the cell unit is immersed.

3. The metal-air battery according to claim 1, wherein the handle is provided with a finger-catching part on which a finger catches.

* * * * *